United States Patent
Wokoeck et al.

(10) Patent No.: US 10,040,449 B2
(45) Date of Patent: Aug. 7, 2018

(54) METHOD FOR AVOIDING A REAR-END COLLISION BETWEEN A FIRST VEHICLE AND A SECOND VEHICLE AND CONTROL UNIT

(71) Applicant: Robert Bosch GmbH, Stuttgart (DE)

(72) Inventors: Till Wokoeck, Reutlingen (DE); Andreas Hoffmann, Stuttgart (DE); Andreas Kern, Tuebingen (DE); Gabriel Iran, Bietigheim-Bissingen (DE); Liv Proenneke, Stuttgart (DE); Vladimir Belau, Illingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/446,481

(22) Filed: Mar. 1, 2017

(65) Prior Publication Data
US 2017/0259813 A1    Sep. 14, 2017

(30) Foreign Application Priority Data

Mar. 8, 2016    (DE) .................... 10 2016 203 727

(51) Int. Cl.
*B60W 30/09*    (2012.01)
*B60W 10/04*    (2006.01)
*B60W 10/20*    (2006.01)

(52) U.S. Cl.
CPC ............ *B60W 30/09* (2013.01); *B60W 10/04* (2013.01); *B60W 10/20* (2013.01); *B60W 2550/30* (2013.01); *B60W 2710/20* (2013.01); *B60W 2720/10* (2013.01)

(58) Field of Classification Search
CPC ...... B60W 30/09; B60W 10/04; B60W 10/20; B60W 2550/30; B60W 2710/20; B60W 2720/10
USPC ........ 701/301, 70, 96, 93, 41; 340/435, 903, 340/467, 465; 180/275
See application file for complete search history.

(56) References Cited

U.S. PATENT DOCUMENTS

| | | | | |
|---|---|---|---|---|
| 6,119,068 A | * | 9/2000 | Kannonji | B60Q 9/008 180/271 |
| 6,737,963 B2 | * | 5/2004 | Gutta | B60Q 9/008 180/271 |
| 2004/0150514 A1 | * | 8/2004 | Newman | B60Q 9/008 340/435 |
| 2010/0241311 A1 | * | 9/2010 | Baumann | B60R 21/0134 701/36 |
| 2014/0067220 A1 | * | 3/2014 | Seiler | B60T 7/12 701/70 |
| 2014/0067248 A1 | * | 3/2014 | Braunberger | B60W 30/143 701/301 |
| 2014/0350836 A1 | * | 11/2014 | Stettner | G01S 17/023 701/301 |

* cited by examiner

*Primary Examiner* — Marthe Y Marc-Coleman
(74) *Attorney, Agent, or Firm* — Norton Rose Fulbright US LLP; Gerard Messina

(57) ABSTRACT

A method for avoiding a rear-end collision between a first vehicle and a second vehicle, in which a distance value is initially read in, which represents a distance, which is detected by a distance sensor of the first vehicle, between the first vehicle and the second vehicle. In particular, the first vehicle is located ahead of the second vehicle in a travel direction of the second vehicle. Using the distance value, a control signal is thereupon generated for controlling the first vehicle to avoid the rear-end collision.

8 Claims, 4 Drawing Sheets

METHOD FOR AVOIDING A REAR-END COLLISION BETWEEN A FIRST VEHICLE AND A SECOND VEHICLE AND CONTROL UNIT

RELATED APPLICATION INFORMATION

The present application claims priority to and the benefit of German patent application no. 10 2016 203 727.7, which was filed in Germany on Mar. 8, 2016, the disclosure of which is incorporated herein by reference.

FIELD OF THE INVENTION

The present invention is directed to a device or a method according to the definition of the species in the independent claims. The subject matter of the present invention is also a computer program.

BACKGROUND INFORMATION

Anticipatory driving is gaining more and more significance, not only with regard to the development of self-driving vehicles. For example, accidents may be avoided by anticipatory braking. In particular in hybrid vehicles, for example, a prediction with respect to a power consumption occurring during driving of a specific route may be very useful.

Images may be analyzed, for example, with the aid of pattern recognition and suitable methods of image processing, to recognize certain image contents. These include, for example, face recognition in digital cameras for autofocusing or error recognition in production lines, but also the recognition of images and image details of media products, which may be linked in this way to items of information on content or prices.

SUMMARY OF THE INVENTION

Against this background, a method for avoiding a rear-end collision between a first vehicle and a second vehicle, a control unit which uses this method, and finally a corresponding computer program according to the main descriptions herein are provided using the approach presented here. Advantageous refinements of and improvements on the device specified in the independent claim are made possible by way of the measures indicated in the descriptions herein.

A method for avoiding a rear-end collision between a first vehicle and a second vehicle is provided, the method including the following steps:

reading in a distance value, which represents a distance, which is detected by a distance sensor of the first vehicle, between the first vehicle and the second vehicle, in particular the first vehicle being located ahead of the second vehicle in a travel direction of the second vehicle; and generating a control signal to control the first vehicle using the distance value, to avoid the rear-end collision.

The first vehicle and the second vehicle may be, for example, a motor vehicle, such as a passenger automobile, a truck, or a motorcycle. In particular, the second vehicle may be a vehicle following the first vehicle. The first vehicle may be an autonomous vehicle, for example. A distance sensor may be understood, for example, as an optical sensor or an ultrasonic, radar, or LIDAR sensor. The surroundings sensor may be a camera in particular. For example, the first vehicle may be accelerated or steered using the control signal, in order to evade the second vehicle.

The approach described here is based on the finding that a vehicle may be automatically controlled as a function of a detected distance to a further vehicle, which follows the vehicle, for example, in such a way that a rear-end collision may be avoided during the approach of the further vehicle to the vehicle, for example, if the braking distance of the further vehicle is too short for timely braking. The traffic safety may be increased by such rear-end collision avoidance for motor vehicles.

According to one specific embodiment, in the step of reading in, at least one further distance value may be read in, which represents a further distance, which is detected by the distance sensor, between the first vehicle and the second vehicle. In this case, in a step of determining, a velocity value which represents a velocity of the second vehicle may be determined using the distance value and the further distance value. Accordingly, in the step of generating, the control signal may be generated using the velocity value. For example, the distance value may have been obtained at a first point in time and the further distance value may have been obtained at a second point in time, which follows the first point in time, from the surroundings sensor. Thus, for example, in the step of determining, a difference may be formed from the distance value and the further distance value and the velocity value may be determined on the basis of the difference and a time span delimited by the two points in time. The first vehicle may be controlled as a function of a velocity of the second vehicle by way of this specific embodiment.

According to another specific embodiment, the method may include a step of ascertaining a braking distance value, which represents a braking distance of the second vehicle, using the velocity value. In this case, in the step of generating, the control signal may be generated using the braking distance value. A braking distance may be understood as a distance which is required to decelerate the second vehicle to a standstill. The braking distance value may be ascertained using a predefined braking power of the second vehicle. The first vehicle may be controlled as a function of a braking distance of the second vehicle by way of this specific embodiment.

Furthermore, the method may include a step of comparing the braking distance value to the distance value and, additionally or alternatively, to the further distance value. In this case, in the step of generating, the control signal may be generated as a function of a result of the comparison. It may be recognized with high reliability and accuracy by way of this specific embodiment whether the second vehicle will have a rear-end collision with the first vehicle during braking.

It is advantageous if, in the step of reading in, a surroundings signal, which represents surroundings of the first vehicle detected by a surroundings sensor of the first vehicle, is read in. In this case, it may be checked in a step of checking using the surroundings signal whether the surroundings have at least one evasion area into which the first vehicle may drive. Accordingly, in the step of generating, the control signal may be generated as a function of a result of the check. An evasion area may be understood as a partial area of the surroundings into which the first vehicle may drive in order to evade the second vehicle to avoid a rear-end collision. A high level of traffic safety may be ensured when the method is carried out by way of this specific embodiment.

It is particularly advantageous if, in the step of generating, the control signal is generated to steer the first vehicle into the evasion area if the check reveals that the surroundings include the evasion area. It is thus made possible for the first vehicle to avoid the second vehicle, without other road users being endangered thereby.

It is also advantageous if, in the step of reading in, a further velocity value which represents a velocity of the first vehicle is furthermore read in. In this case, in the step of generating, the control signal may be generated using the further velocity value. This specific embodiment enables a control of the first vehicle as a function of a velocity of the first vehicle. For example, the method may be carried out if the further velocity value is equal to zero, i.e., the first vehicle has stopped, for example, at an intersection or a red traffic light.

This method may be implemented, for example, in hardware or software or in a mixed form of hardware and software, for example, in a control unit.

The approach presented here furthermore provides a control unit, which is configured to carry out, control, or implement the steps of a variant of a method presented here in corresponding units. The object underlying the present invention may also be achieved rapidly and efficiently by this embodiment variant of the present invention in the form of a control unit.

For this purpose, the control unit may include at least one processing unit for processing signals or data, at least one storage unit for storing signals or data, at least one interface to a sensor or an actuator for reading in sensor signals from the sensor or for outputting control signals to the actuator, and/or at least one communication interface for reading in or outputting data, which are embedded in a communication protocol. The processing unit may be, for example, a signal processor, a microcontroller, or the like, the storage unit being able to be a flash memory, an EPROM, or a magnetic storage unit. The communication interface may be configured to read in or output data in a wireless and/or wired fashion, a communication interface which may read in or output data in a wired fashion being able to read in these data, for example, electrically or optically from a corresponding data transmission line or output them into a corresponding data transmission line.

A control unit may be understood in the present case as an electrical device which processes sensor signals and outputs control and/or data signals as a function thereof. The control unit may include an interface, which may be configured in hardware and/or software. In a hardware design, the interfaces may be part of a so-called system ASIC, for example, which includes greatly varying functions of the control unit. However, it is also possible that the interfaces are separate integrated circuits or are at least partially made up of discrete components. In a software design, the interfaces may be software modules, which are present on a microcontroller in addition to other software modules, for example.

In one advantageous embodiment, a control of the first vehicle is carried out by the control unit. For this purpose, the control unit may access, for example, sensor signals, such as surroundings sensor signals, acceleration sensor signals, or steering angle sensor signals. The control is carried out via actuators, for example, brake or steering actuators.

A computer program product or computer program having program code is also advantageous, which may be stored on a machine-readable carrier or storage medium such as a semiconductor memory, a hard drive memory, or an optical memory, and is used for carrying out, implementing, and/or controlling the steps of the method according to one of the above-described specific embodiments, in particular when the program product or program is executed on a computer or a device.

Exemplary embodiments of the present invention are illustrated in the drawings and explained in greater detail in the following description.

In the following description of advantageous exemplary embodiments of the present invention, identical or similar reference numerals are used for the elements which are shown in the various figures and act similarly, a repeated description of these elements being omitted.

DETAILED DESCRIPTION

Figure 1:
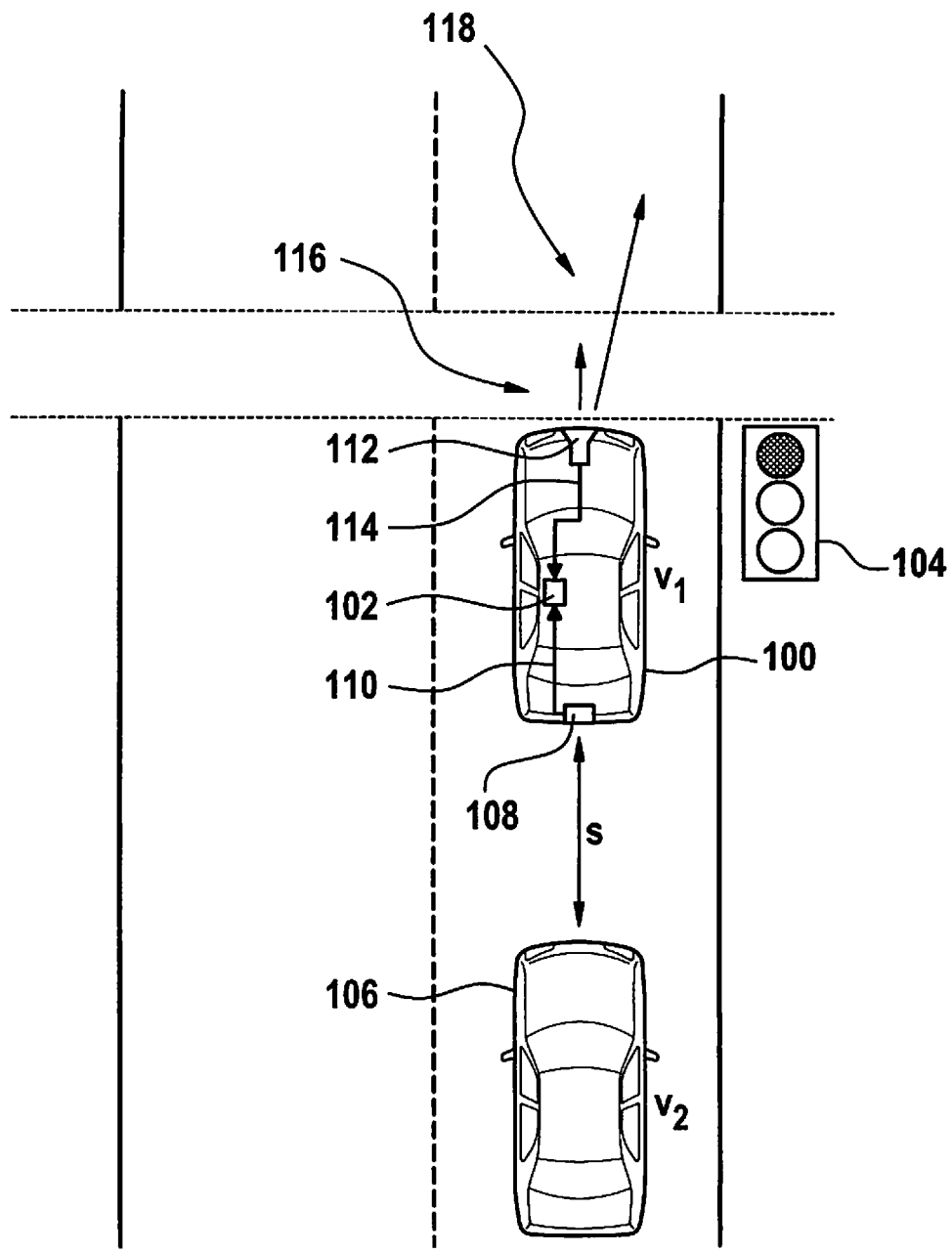
FIG. 1 shows a schematic view of a vehicle including a control unit according to one exemplary embodiment.

FIG. 1 shows a schematic view of a vehicle 100 including a control unit 102 according to one exemplary embodiment. For example, first vehicle 100 is located in FIG. 1 at an intersection in front of a red traffic light 104, with a second vehicle 106 approaching first vehicle 100 from the rear. First vehicle 100 is therefore located ahead of second vehicle 106 with respect to a travel direction of second vehicle 106. First vehicle 100 has a distance sensor 108, which is configured to detect a distance s between first vehicle 100 and second vehicle 106 and to transmit a distance value 110 representing the distance to control unit 102. Control unit 102 is configured to evaluate distance value 110 and to control first vehicle 100 as a function of a result of the evaluation in such a way that a rear-end collision between first vehicle 100 and second vehicle 106 is avoided.

According to this exemplary embodiment, first vehicle 100 is furthermore equipped with a surroundings sensor 112, a camera here, which is configured to detect surroundings of first vehicle 100 and to transmit a surroundings signal 114, which represents the surroundings, to control unit 102. Control unit 102 evaluates surroundings signal 112, to check the surroundings for free evasion areas, which enable first vehicle 100 to evade second vehicle 106 in a timely fashion, without endangering other road users. In FIG. 1, control unit 102 recognizes, for example, a first evasion area 116 located ahead of vehicle 100, in the form of a crosswalk, and a second evasion area 118, which adjoins first evasion area 116, which is an area, which adjoins the crosswalk, of a roadway of the two vehicles 100, 106. Control unit 102 may therefore be configured to steer first vehicle 100 using distance value 110 into at least one of the two evasion areas 116, 118.

For example, first vehicle 100 is a stationary motor vehicle, which may recognize with the aid of sensors a point in time from which second vehicle 106 will collide with first vehicle 100. If an area ahead of stationary vehicle 100 is free, it thus travels forward, for example, to prevent an impact.

Second vehicle 106 is, for example, a conventional motor vehicle having a driver. In contrast, first vehicle 100 is equipped with required sensors and actuators for autonomous driving.

According to FIG. 1, $v_1=0$ km/h and $v_2>0$ km/h, $v_1$ representing the velocity of first vehicle 100 and $v_2$ representing the velocity of second vehicle 106.

First vehicle 100 continuously checks whether areas 116, 118 are free.

In a first step, first vehicle 100 measures distance s between the vehicles via sensor. By way of a new distance measurement, first vehicle 100 additionally measures velocity $v_2$, where $v_2=\Delta s/\Delta t$.

In a second step, first vehicle 100 calculates whether second vehicle 106 has a sufficient distance s for braking. Braking power $a_b$ of second vehicle 106 is estimated conservatively, for example. The calculation is carried out, for example, using the formula $s>v_2^2/(2a_b)$.

If the second step reveals that a collision will occur and at least one of the two areas 116, 118 is free, the particular free area is thus used in a third step to carry out an evasive maneuver, in which first vehicle 100 drives forward over the free area and therefore increases braking distance s.

If both areas are required for evasion, but only one of the two areas is free, the one free area may thus nonetheless be used to at least mitigate the collision.

The two areas 116, 118 symbolize free areas ahead of first vehicle 100. The number of these detected free areas which are possibly used may be arbitrarily high. Only two free areas are shown in FIG. 1 for simplification. The red traffic light is an example of a reason for stopping of first vehicle 100.

Further reasons for stopping are, for example, a crosswalk, the tail end of a traffic jam, or an intersection.

Figure 2:
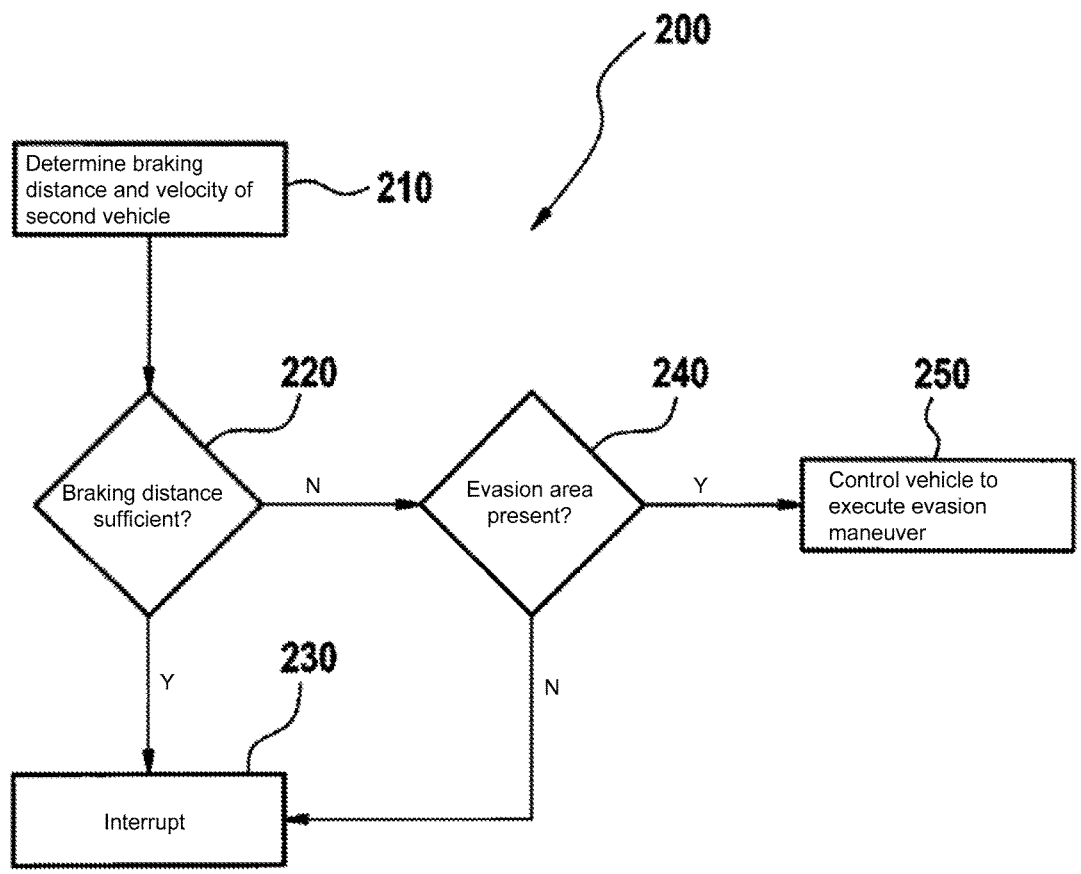
FIG. 2 shows a schematic view of a computation chain for controlling a vehicle from FIG. 1.

FIG. 2 shows a schematic view of a computation chain 200 for the control of a vehicle from FIG. 1. Computation chain 200 may be executed, for example, using a control unit as described on the basis of FIG. 1. In this case, a braking distance and a velocity of the second vehicle are computed in a first step 210. Subsequently, it is checked in a step 220 whether the braking distance is sufficient. If step 220 reveals that the braking distance is sufficient, computation chain 200 is interrupted in a step 230, since in this case the second vehicle comes to a stop in a timely manner without additional intervention by the first vehicle. In contrast, if step 220 reveals that the braking distance is not sufficient, it is thus checked in a step 240 whether the surroundings include at least one free evasion area for carrying out an evasive maneuver. If step 240 reveals that the surroundings include such an evasion area, the first vehicle is thus controlled in a step 250 in such a way that it drives into the evasion area, to be able to avoid the second vehicle. In contrast, if step 240 reveals that the surroundings do not include a free evasion area, computation chain 200 is again interrupted in step 230, i.e., no automatic control of the first vehicle takes place.

Computation chain 200 may be passed through continuously.

Figure 3:
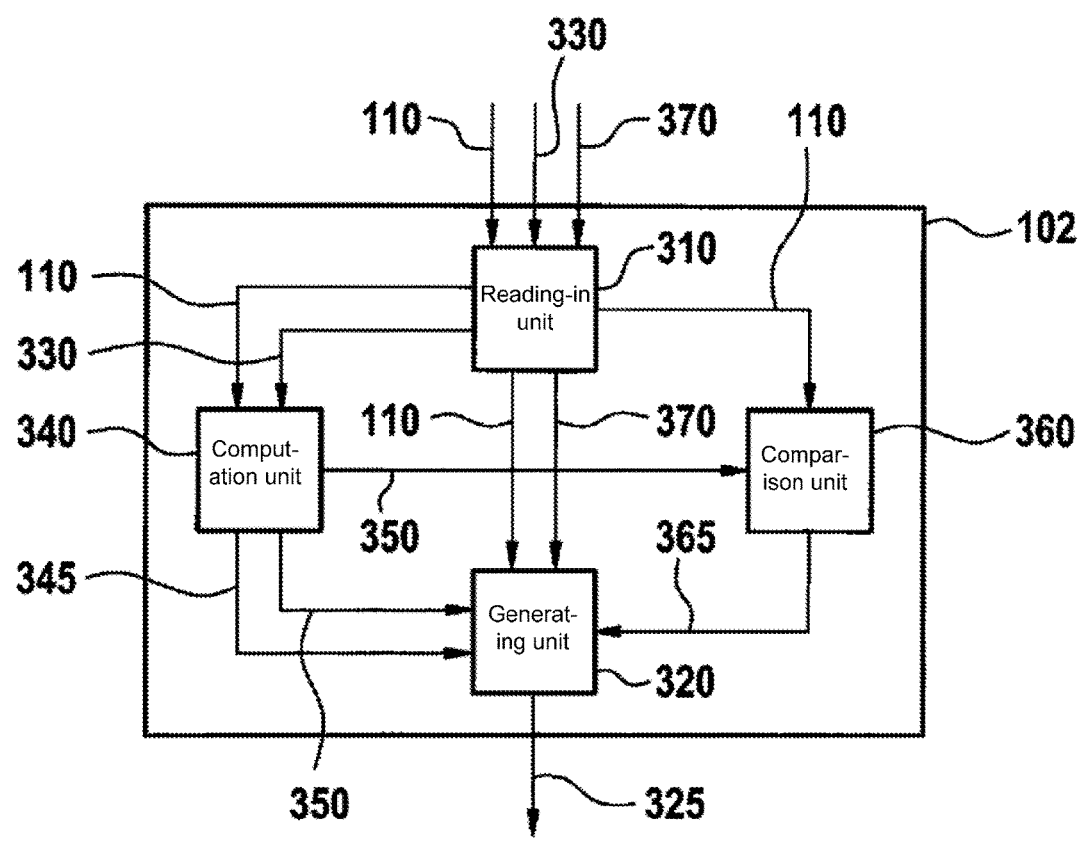
FIG. 3 shows a schematic view of a control unit according to one exemplary embodiment.

FIG. 3 shows a schematic view of a control unit 102 according to one exemplary embodiment. Control unit 102 is, for example, a control unit as described above on the basis of FIGS. 1 and 2. Control unit 102 includes a reading-in unit 310 for reading in distance value 110. Reading-in unit 310 is configured to relay distance value 110 to a generating unit 320, generating unit 320 being configured to generate a control signal 325 for controlling the first vehicle using distance value 110. Control signal 325 is used, for example, to control a steering actuator or brake actuator or an engine of the first vehicle.

According to one optional exemplary embodiment, reading-in unit 310 is configured to additionally read in a further distance value 330, which represents a further distance, which is detected by the distance sensor of the first vehicle, between the first vehicle and the second vehicle. An optional computation unit 340 is configured to determine a velocity value 345, which represents an instantaneous velocity of the second vehicle approaching the first vehicle, using the two distance values 110, 330. Computation unit 340 relays velocity value 345 to generating unit 320, which processes this value to generate control signal 325.

According to one alternative exemplary embodiment, computation unit 340 is configured to determine a braking distance of the second vehicle using velocity value 345 and to transmit a braking distance value 350, which represents the braking distance, to generating unit 320. In this case, generating unit 320 is configured to generate control signal 325 using braking distance value 350.

According to another exemplary embodiment, control unit 102 includes an optional comparison unit 360, which is configured to receive braking distance value 350 and at least one of the two distance values 110, 330, distance value 110 here, and to compare the braking distance to the distance or the further distance using the appropriate values. As a result of the comparison, comparison unit 360 generates a comparison signal 365, which may be used by generating unit 320 to generate control signal 325.

Reading-in unit 310 may additionally be configured to read in a further velocity value 370 representing a velocity of the first vehicle and relay it to generating unit 320, so that generating unit 320 may furthermore generate control signal 325 using further velocity value 370.

Figure 4:
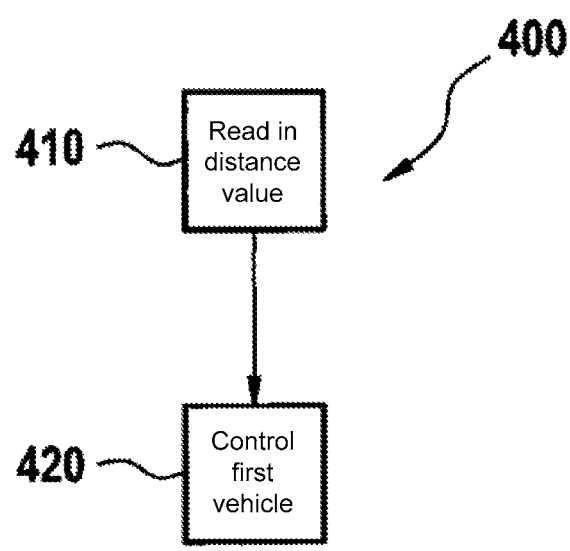
FIG. 4 shows a flow chart of a method according to one exemplary embodiment.

FIG. 4 shows a flow chart of a method 400 according to one exemplary embodiment. Method 400 may be carried out or controlled, for example, in conjunction with a control unit as described above on the basis of FIGS. 1 through 3. Method 400 includes a step 410, in which the distance value is read in. In a further step 420, the control signal for controlling the first vehicle is generated using the distance value.

Method 400 may be carried out continuously.

If an exemplary embodiment includes an "and/or" linkage between a first feature and a second feature, this is to be read to mean that the exemplary embodiment according to one specific embodiment includes both the first feature and the second feature and according to another specific embodiment it includes either only the first feature or only the second feature.

What is claimed is:

1. A method for avoiding a rear-end collision between a first vehicle and a second vehicle that, with respect to a travel direction of the second vehicle, is behind the first vehicle, the first vehicle including a first sensor, a drive unit, and processing circuitry interfacing with the first sensor and the drive unit, the method comprising:

while the second vehicle is traveling towards the first vehicle, sensing, by the first sensor of the first vehicle, a first distance of the second vehicle from the first vehicle at first moment in time and a second distance of the second vehicle from the first vehicle at a second moment of time after the first moment in time;

obtaining, by the processing circuitry of the first vehicle and from the first sensor, respective signals identifying the first and second sensed distances;

based on a combination of the sensed distances identified by the obtained signals, determining, by the processing circuitry, a speed of the second vehicle relative to the first vehicle;

determining, by the processing circuitry, whether the second distance is greater than a ratio of the speed squared to a predefined constant;

based on a negative result of the determination, generating and outputting, by the processing circuitry and to the drive unit, a control signal; and responsive to the control signal, the drive unit of the first vehicle accelerating the first vehicle, so as to avoid the rear-end collision.

2. The method of claim 1, wherein the ratio represents a braking distance of the second vehicle.

3. The method of claim 1, further comprising:

sensing, by a second sensor of the first vehicle, a state of surroundings of the first vehicle; and determining, by the processing circuitry and based on a surroundings signal from the second sensor that represents the sensed state, whether the surroundings includes at least one evasion area, wherein the generating of the control signal is conditional on a result of the determination regarding the evasion area being that the at least one evasion area is present.

4. The method of claim 3, wherein the drive unit responds to the control signal by steering the first vehicle into the evasion area.

5. The method of claim 1, wherein the generating and outputting of the control signal is further based on a value of a velocity of the first vehicle obtained by the first vehicle.

6. The method of claim 1, wherein the predefined constant represents twice an estimated maximum braking power of the second vehicle.

7. A vehicle, comprising:

a distance sensor;

a drive unit; and processing circuitry interfacing with the distance sensor and the drive unit;

wherein:

the distance sensor is configured to, while a second vehicle, that is behind the first vehicle with respect to a travel direction of the second vehicle, is traveling towards the first vehicle, sense a first distance of the second vehicle from the first vehicle at a first moment in time and a second distance of the second vehicle from the first vehicle at a second moment in time after the first moment in time;

the processing circuitry is configured to:

obtain from the distance sensor respective signals identifying the first and second sensed distances;

based on a combination of the sensed distances identified by the obtained signals, determine a speed of the second vehicle relative to the first vehicle;

determine whether the second distance is greater than a ratio of the speed squared to a predefined constant; and based on a negative result of the determination, generate and output to the drive unit a control signal; and the drive unit is configured to respond to the control signal by accelerating the first vehicle to avoid a rear-end collision.

8. A non-transitory computer readable medium on which are stored instructions executable by a processor that is of a first vehicle and that interfaces with a distance sensor of the first vehicle and a drive unit of the first vehicle, the instructions, wherein the instructions, when executed by the processor, cause the processor to perform a method for avoiding a rear-end collision between the first vehicle and a second vehicle that, with respect to a travel direction of the second vehicle, is behind the first vehicle, the method comprising:

while the second vehicle is traveling towards the first vehicle, obtaining from the distance sensor a first sensor signal that represents a first distance of the second vehicle from the first vehicle sensed by the distance sensor at a first moment in time and a second sensor signal that represents a second distance of the second vehicle from the first vehicle sensed by the distance sensor at a second moment in time;

based on a combination of the sensed distances identified by the obtained signals, determining a speed of the second vehicle relative to the first vehicle;

determining whether the second distance is greater than a ratio of the speed squared to a predefined constant; and based on a negative result of the determination, generating and outputting to the drive unit a control signal that triggers the drive unit of the first vehicle to accelerate the first vehicle to avoid the rear-end collision.

\* \* \* \* \*